Patented Oct. 4, 1949

2,483,800

UNITED STATES PATENT OFFICE 2,483,800

GREASE COMPOSITION

John C. Zimmer, Union, and Gordon W. Duncan, Westfield, N. J., assignors to Standard Oil Development Company, a corporation of Delaware No Drawing. Application April 23, 1948, Serial No. 22,958

6 Claims. (Cl. 252—33.2)

The present invention relates to improved grease compositions, particularly reversible greases which are transparent, mechanically and thermally stable, and adapted for use in "lubricated-for-life" bearings or under conditions where either high temperatures, water contamination or both are encountered. Reversible greases are those grease compositions which can be heated to above their melting point and upon being cooled revert to their original consistency.

This application is a continuation-in-part of a prior application, Serial No. 570,785, filed December 30, 1944, now Patent No. 2,444,970, issued July 13, 1948. The present application relates particularly to the nitrate and other oxy-nitrogen derivatives which are suggested in said parent application, but not claimed therein.

Many types of mechanical mechanisms including electrical motors and generators operate at such high speeds that high bearing temperatures are generated or equipment is installed in close proximity to a direct source of heat, which results in the operation of the equipment at high temperatures. If the design of the equipment or its location necessitates the use of a grease as the lubricant, then high temperature creates a difficult lubrication problem. Although not unique in this respect, electrical generators, such as those attached to internal combustion engines, for example aircraft or Diesel locomotives provide a typical example of the requirement in high temperature lubrication. In their construction these generators contain sealed and lubricated anti-friction bearings, which it is contemplated will not need replacement or relubrication during the life of the generator. When the engines to which these generators are attached are operated over an extended period of time these generators, due to heat radiation, conduction, and other causes, attain temperatures which ordinary greases will not withstand. Circumstances such as these require the use of a high melting point grease, resistant to elevated temperatures. High temperature greases are customarily made using an alkali, such as sodium, and in order to obtain the high melting point required in a high temperature grease, a considerable excess of alkali over that needed to neutralize the fatty acid is commonly employed. High temperature greases containing excess alkali, although they possess the desired high melting point, are deficient in several other respects. They tend to be water-soluble and readily disintegrate in contact with moisture or under humid conditions, and unless proper care is taken in selecting the fatty acid from which the alkali soap is made, evidence a strong tendency to be unstable during storage in that the soap fails to hold the oil, as manifest by free oil which has separated from the grease. Furthermore, high temperature greases containing an excess of alkali are subject to operational difficulties in that at temperatures above about 180° F. they may become stiff and develop a fibrous structure, and wrap themselves around a rotating shaft and thus be pulled out of its bearing, losing the soft buttery consistency desired in greases. This is particularly so when the grease is prepared from fatty oils or fatty acids containing unsaturated constituents such as oleic or linoleic acid, etc. This tendency of a high temperature alkali grease to change its grease structure at high temperatures can be shown by an irregular resistance to flow under pressure in the range of temperatures above 170° F. up to the melting point of the grease.

The principal object of the present invention is to produce a grease composition which will provide adequate lubrication at both high and low temperatures, and one that will not at high temperatures tend to pull out of the bearing because of its fibrous structure or break down to a semifluid liquid under the churning action or torque of the mechanism lubricated. Another object is to provide a high temperature grease which is stable against oil separation during storage. Other and further objects such as water insolubility, oxidation stability, etc. will be apparent to those skilled in the art from a reading of the following description.

The grease compositions made in accordance with the present invention comprise essentially a mineral lubricating oil and the reaction product of a salt of an oil-soluble sulfonic acid with a salt of another acid, wherein at least one of the metal ions is polyvalent, although other ingredients may be included in the grease compositions such as dyes, other grease-making soaps, fillers, inhibitors, E. P. additives, tack or stringiness promoters, and the like. In addition modifying agents such as mono or polyhydroxy compounds, organic bases, metal soaps, esters, phosphate esters and thioesters, xanthates, fatty oils, sulfurized materials, sulfur and chlorine-containing compounds, phenates, phenol sulfides, phosphorous sulfide treated materials, alkylated phenols, aryl or alkyl amines, alkanol amines, metal deactivators, etc. may be included. The metal ion of both the oil-soluble metal sulfonates and the reactant salts may be almost any desired providing the corresponding compound and the acid radicals are suitably chosen. In general, metals of either group I, such as sodium or lithium or group II, such as calcium or magnesium, of the periodic table, are preferred although for some purposes other metals such as zinc, tin, lead, aluminum or organic bases may be employed. In most cases salts of nitrogen oxide acids are preferred for reaction with the oil-soluble metal sulfonate although phosphates, chromates, manganates, molybdates, stannates may also be employed. If the cation of the oil-soluble sulfonate is a polyvalent metal such as calcium, magnesium or barium, then the cation of the reactant salt may be a monovalent metal such as sodium, potassium, lithium, etc., an organic base or a polyvalent metal such as magnesium, calcium, barium, zinc, lead, etc. On the other hand, where the cation of the oil-soluble sulfonate is monovalent such as sodium or is an organic base, a reactant salt must be selected having a polyvalent metal ion such as calcium, barium, magnesium or lead.

In general, maximum bodying or thickening and melting point raising effects are obtained by employing an amount of reactant salt such that the number of anions of the reactant approximates the number of sulfonate ions present. Smaller amounts of the water-soluble constituents yield a softer and lower melting product, whereas amounts in excess of that indicated above tend to give cloudy products with little further increase in hardness or melting point.

The presence of certain ions as impurities in the sulfonate solution tends to block the formation of the desired grease. For example, chloride ions may be present in the case of calcium sulfonate-calcium nitrate complex greases and these prevent formation of a good grease. If so such ions must be removed or inactivated to obtain a satisfactory product. In this example, the chloride may be removed by water washing or, if an absolutely clear grease is not required, the chloride may be inactivated without removing it by incorporating sufficient lead nitrate with the calcium nitrate to combine all the chloride ions as insoluble lead chloride. Some calcium sulfonates as manufactured also may contain calcium hydroxide as an impurity or combined as a complex with the sulfonate. In this case, reaction with the desired free acid, such as nitric or nitrous acid, may be effective to neutralize the impurity and to form a satisfactory grease structure or, as a rule, the grease may be left alkaline with no particular adverse effect.

Experience has established in grease making and in the use of greases that it is best practice to select as the lubricating oil in the grease an oil of the same type as would have been selected if a liquid lubricant could be used. A wide range of lubricating oils is therefore permissible in grease production. In general, the base oil in the compositions of the present invention comprises an oil having S. U. V. in the range of from about 30 to 220 seconds at 210° F. However, for the production of most greases of the type contemplated by this invention, it is preferred to use a base oil having a viscosity of from 100 to 2500 at 100° F.

The oil-soluble metal sulfonates previously referred to may be synthetically derived by sulfonating olefins, aliphatic fatty acids, or their esters, alkylated aromatics or their hydroxy derivatives, partially hydrogenated aromatics, etc. with sulfuric acid or other sulfonating agents. However, the soaps of so-called mahogany acids which are usually produced during treatment of lubricating oil distillates with concentrated sulfuric acid (85% or higher concentration) remain in the oil after settling out sludge. These sulfonic acids may be represented as

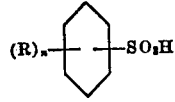

where (R) is one or more alkyl, alkaryl or aralkyl groups and the aromatic nucleus may be a single or condensed ring or a partially hydrogenated ring. The lower molecular weight acids can be extracted from the acid-treated oil by adding a small amount of water, preferably after dilution of the oil with kerosene. However, the more desirable high molecular weight (350–500) acids, particularly those produced when treating petroleum distillates with fuming acid to produce white oil, are normally recovered as sodium soaps by neutralizing the acid oil with sodium hydroxide or carbonate and extracting with aqueous alcohol. The crude soap extract is first recovered as a water curd after removal of alcohol by distillation and a gravity separation of some of the contaminating salts (sodium carbonate, sulfates and sulfites). These materials still contain considerable quantities of salts and consequently are normally purified by addition of a more concentrated alcohol followed by storage to permit settling of salt brine. The alcohol and water are then stripped out and replaced with a light lubricating oil to yield the commercial purified concentrate, generally containing from 25–70% sodium sulfonate.

Polyvalent metal sulfonates are prepared from acid-treated oils or extracted sulfonic acids by neutralizing directly with an oxide, hydroxide or carbonate of the desired metal or direct reaction of the acid with metals such as zinc or magnesium. However, it is often more convenient to prepare them from the sodium salt by double decomposition. Thus, the polyvalent metal salts may be made by precipitating the sodium sulfonates from alcoholic solutions with a polyvalent metal salt. For example, the calcium metal sulfonate may be prepared by precipitating from alcohol solutions with calcium chloride, the resulting water-soluble inorganic salts being then removed by washing with water. The calcium sulfonates are then dehydrated in the presence of sufficient oil to yield an ultimate concentrate containing from 10–60% of calcium sulfonate in oil. Or an oil solution of sodium sulfonate may be emulsified with an aqueous solution of a polyvalent metal salt followed by dehydration and separation of the inorganic sodium salt formed.

It has now been found that oil-soluble sulfonates like alkali metal sulfonates such as the sulfonates of sodium, potassium and lithium; alkaline earth metal sulfonates such as the sulfonates of calcium and barium; other polyvalent metal sulfonates like those of magnesium, lead, copper, nickel, iron, zinc, aluminum, etc.; as well as the oil-soluble aliphatic amine sulfonates of which di-2-ethylhexyl-amine, cyclohexylamine, oleyl amine sulfonates are examples, can be converted to complex coordination compounds of the so-called Werner type which are lyophilic but not oil-soluble and which have the property of thickening lubricating oils to yield plastic high melting point grease-like solids. The conversion of oil-soluble sulfonates to the oil-insoluble complex is accomplished by reacting the oil-soluble sulfonate with a water-soluble salt of a nitrogen oxide acid such as a nitrite or a nitrate; or the oil-soluble sulfonate can be reacted with a water-soluble salt of a low molecular weight carboxylic acid of which the acetate, oxalate, formate, tartrate, succinate, citrate, propionate, lactate, glycolate and malate are exemplary. Compositions obtained by reacting with the acetates, for example, are claimed specifically in the parent application, Serial No. 570,785, previously mentioned. Other water-soluble salts which may be employed alone or in combination are sulfides, thio sulfites, thio sulfates, thio xanthates, silicates, fluo silicates, borates, xanthates, etc. The formation of an oil-insoluble complex depends upon the presence in the reaction of a polyvalent cation, and it is therefore necessary that either the oil-soluble sulfonate or the reacting salt contain polyvalent metal. For example, a polyvalent metal sulfonate such as calcium sulfonate may be reacted with a salt containing a monovalent metal as for instance sodium, potassium or lithium nitrate; also polyvalent metal sulfonates can be reacted with the nitrate of similar or dissimilar polyvalent metals such as magnesium, calcium, barium, lead, tin, etc. On the other hand, oil-soluble sulfonates containing monovalent cations such as sodium, potassium and lithium or an aliphatic amine radical must be reacted with a salt having a polyvalent metal cation.

The high temperature grease compositions of the present invention are preferably made by first preparing a solution of the oil-soluble sulfonate in a mineral lubricating oil of the type desired, emulsifying the oil solution with an aqueous solution or solution-suspension of the reactant salt, and dehydrating by boiling to form the complex-bodied grease. In the reaction mixture it is generally desirable to include a de-foaming agent to prevent the occurrence of excessive foam during dehydration. One may also feasibly prepare the complex separately, usually as a curdy emulsion, and then incorporate it in the desired mineral lubricating oil after the manner customarily employed in the production of grease compositions. If desired the separate components may be continuously metered by pumps into a mixing chamber in the desired proportion and the blended materials removed from the chamber, passed through homogenizing or dispersing mechanisms, such as a Lancaster disperser, a centrifugal or a gear pump, cooled in a helical screw type jacketed cylindrical cooler and filled directly into shipping containers using the procedure known to the art for the production of greases by continuous rather than batch for kettle processes.

A practical means of preparing grease compositions of the present invention is to select an oil of the desired characteristics, treat it with concentrated sulfuric acid or other sulfonating agent to form the desired concentration of sulfonic acids in the oil, separate the oil from the sludge formed, air blow to remove sulfur dioxide, neutralize the sulfonic acids by treatment with an oxide, hydroxide or carbonate of the desired metal, filter to remove inorganic salts, and react the resultant oil solution with an aqueous solution of the desired reactant salt. A variation of this method is to employ a double amount of the reactant salt in the sulfonic acid oil solution, the acid of the reactant salt being stripped out during dehydration.

The melting point and consistency of the final grease will depend directly upon the proportion and character of the complex in the finished grease. The oil-soluble sulfonates have combining weights ranging from 300 to 600, the choice of which is somewhat influential upon the character of the final grease. Those of 350 to 500 combining weight are usually preferred. The amount of sulfonate complex present in the finished grease will range between about 0.5% for the fluid grease, up to 50% in the extremely hard greases. The exact amount of complex to be incorporated in the finished grease is controlled by the type of grease and consistency desired. Where the sulfonate complex is made "in situ" in the mineral lubricating oil, two avenues of approach are open for securing the desired results. A mineral lubricating oil containing a fixed amount such as 1, 5, 10, 20 or even 50% of soluble-sulfonate can be selected and this solution is then reacted with sufficient of the water-soluble reactant to yield a grease containing the desired amount of sulfonate complex or in other words, the desired consistency and melting point. On the other hand, an oil may be selected containing just enough soluble sulfonate dissolved therein to yield the desired amount of sulfonate complex when reacted on an anion per anion basis. The foregoing reactions may be carried out at room temperature, but in general it is desirable to emulsify the oil solution of sulfonate and the aqueous solution of the reactant at temperatures below the boiling point of water followed by heating in excess of 230° F. to effect substantial dehydration. Greases made in accordance with the foregoing method are reversible high temperature greases having melting points ranging from 225° to 450° F. or higher. If the greases are made at temperatures above 240° F. the finished product will be substantially anhydrous.

The following example will serve further to illustrate the invention.

A steam-jacketed scraped-wall grease kettle may be charged with 3000 grams of a 30% concentrate of calcium sulfonate (approximately 900 mol. wt. as calcium sulfonate) and 3000 grams of a 65 viscosity at 210° F. naphthenic distillate oil. The concentrate and the oil are blended by stirring or otherwise agitating at 180° F. to 200° F. When the solution is complete, about 164 grams, on a dry basis, of calcium nitrate as an aqueous solution may be added, emulsification taking place immediately. About five drops of an organic silicon polymer are preferably added to control foaming and the temperature is rapidly brought up to about 250° to 300° F. A grease structure usually starts to develop at about 250° F. Cold water may next be introduced into the jacket of the kettle to cool the product. Stirring is continued until the grease reaches a temperature of 100° F. at which point it may be removed and packaged. A clear, bright grease which is completely water insoluble may be obtained, having a melting point of about 260° to 270° F.

In lieu of calcium nitrate, calcium nitrite, barium nitrate, barium nitrite and other alkaline earth salts of nitric oxide acids may be used with satisfactory results in many instances. Other inorganic salts, such as the phosphates, etc., of various metals and especially the alkaline earth metals, are useful.

The complex of sulfonate with salt of nitrogen oxide acid or equivalent preferably has substantially equal molar quantities of the anion radicals. In general the latter salt should be water soluble, or substantially non-soluble in oil. The complex formed, apparently, is most satisfactory when it is only marginally soluble in oil at the normal grease operating temperature.

It will be understood that the quantities of the reaction products described above which may be used in lubricating greases may vary considerably and that, if desired, an excess of sulfonate may be used, reacting only a part of it with the salt of oxy-nitrogen acid. In general, though, the anion equivalents are preferred as indicated above. The proportions of sulfonate-salt complex to oil varies over about the same range or a little lower as compared with the soap and oil proportions in prior art lubricating greases. Thus quantities preferred are of the order of 0.5 to 20% by weight of the complex, based on the total composition, but the limits may be broader as previously indicated.

What is claimed is:

1. A grease composition comprising a major proportion mineral base lubricating oil and sufficient of the complex reaction product of an oil-soluble salt of a sulfonic acid having a molecular weight of approximately 300 to 600 and a water-soluble salt of an inorganic acid in which at least one cation in the above salts is polyvalent, said salt being substantially free of chloride ions to thicken the mineral oil to a grease consistency.

2. A grease composition comprising a major proportion of a mineral base lubricating oil and 0.5 to 20% by weight, based on the total composition, of the complex reaction product of an oil-soluble sulfonate salt and a salt of an oxy-nitrogen acid, in which at least 1 cation in the above salts is polyvalent.

3. A grease composition consisting essentially of mineral base lubricating oil and a quantity, sufficient to thicken said oil to a grease consisting of a complex of a metal salt of oil soluble sulfonic acid and calcium nitrate.

4. Product as in claim 3 wherein said complex is formed from proportions of substantially equal numbers of anions of sulfonate and nitrate.

5. A composition consisting essentially of mineral base lubricating oil and 0.5 to 20% by weight, based on the finished composition, of a calcium sulfonate-calcium nitrate complex having substantially equal molar quantities of sulfonate and nitrate radicals.

6. A lubricating grease composition according to claim 1 wherein the molecular weight of the sulfonic acid is between 350 and 500.

JOHN C. ZIMMER.
GORDON W. DUNCAN.

REFERENCES CITED

The following references are of record in the file of this patent:

UNITED STATES PATENTS

| Number | Name | Date |
| --- | --- | --- |
| 1,871,941 | Arveson | Aug. 16, 1932 |
| 2,322,307 | Neely et al. | June 22, 1943 |
| 2,401,508 | Robinson et al. | June 4, 1946 |
| 2,417,431 | McLennan | Mar. 18, 1947 |
| 2,417,433 | McLennan | Mar. 18, 1947 |
| 2,444,970 | Zimmer et al. | July 13, 1948 |